United States Patent [19]

Snyder

[11] Patent Number: 4,974,631
[45] Date of Patent: Dec. 4, 1990

[54] DOME PRESSURE MAINTAINING VALVE
[75] Inventor: David E. Snyder, Longview, Tex.
[73] Assignee: Axelson, Inc., Longview, Tex.
[21] Appl. No.: 420,173
[22] Filed: Oct. 12, 1989
[51] Int. Cl.$^5$ ............................................. G05D 16/04
[52] U.S. Cl. .................................... 137/492; 137/493.2
[58] Field of Search ............................... 137/492, 493.2
[56] References Cited
U.S. PATENT DOCUMENTS

| 21,535 | 9/1858 | Hardy | 137/493.2 |
| 2,634,947 | 4/1953 | Gardner | 137/493.2 X |
| 3,304,951 | 2/1967 | Farris | 137/492 |

Primary Examiner—Robert G. Nilson
Attorney, Agent, or Firm—Hubbard, Thurman, Turner, Tucker & Harris

[57] ABSTRACT

A dome pressure maintaining valve and circuit for maintaining dome fluid pressure in a pilot operated relief valve is presented wherein the dome pressure in the relief valve is prevented from dropping below a preset value even when inlet pressure at the relief valve drops to zero. The dome pressure maintaining valve incorporates a compact check valve and a back flow relief valve with the two components integrated into one piston embodiment, the valve having in communication with a body bore inlet and an outlet. The circuit provides inlet fluid flow in communication with a piston valve chamber through a passage from the inlet port through the piston under the poppet check valve and through multiport and exterior piston valve ring groove means to the outlet port when the inlet fluid pressure is greater than the outlet fluid pressure. However, when the outlet fluid pressure is greater, the poppet check valve is in a check position within the piston valve chamber and the integrated embodiment provides outlet back flow relief which is due to the greater exposed surface area to the outlet pressure above the outlet port within the piston valve chamber creating an upward force on the piston valve. The force differential provides an upward lift of the integrated piston valve with the lift movement establishing a communication passage between the outlet port and the inlet port as a result of the uplift movement of the piston valve away from the piston valve seat and body bore below the piston valve.

14 Claims, 1 Drawing Sheet

DOME PRESSURE MAINTAINING VALVE

BACKGROUND OF THE INVENTION

The present invention relates generally to a dome pressure maintaining valve and its utilization within a pilot operated pressure relief valve circuit. In another aspect, the dome pressure maintaining valve provides an apparatus and method for maintaining pressure in the dome of the relief valve thus keeping the valve in the closed position except under operation of the pilot.

Typically, pilot operated relief valve circuits utilize the pilot to control a large capacity, i.e., main pressure relief valve. Operation of the main valve is accomplished by controlled venting of a volume of fluid above the main valve member resulting in positioning the main valve closure member. In this way, the main relief valve will open due to the sensed over pressure or product pressure in excess of a predetermined value.

In a typical embodiment, the pilot valve operates a main valve by substantially venting the main valve head volume or dome volume to ambient pressure. The design of the main valve is such that prior to the relief valve venting, the main valve closure member or piston is in pressure equilibrium with the tank or pressure vessel or other supply source of pressurized fluids. When the head volume above the relief valve piston is vented to atmosphere, the tank pressure is utilized to lift the piston and open the main valve providing the desired pressure relief. An additional pressure signal to the pilot valve is produced, for example, by a ram tube located adjacent to the tank and/or pressure vessel, which provides an indication of true tank or product pressure allowing the pilot main valve to reset at a correct tank pressure independent of the magnitude of main valve flow.

In pilot operated relief valve circuits, relief valves having opening or relief characteristics of the proportional and instant opening, i.e., "pop" variety are utilized. Relief valves having a proportional opening characteristic provide venting or relief capacity which is proportional to the difference between a predetermined or set pressure and the particular pressure acting on the valve. In contrast, the instant opening or "pop" relief valves provide discharge characteristics which are a constant or maximum after sense pressure exceeds the predetermined or set value.

There have been developed a number of systems for monitoring and protecting flow lines and pressure vessels. These systems include high-low systems which are adapted to maintain flow through a flow line when the pressure within the lines is within a preselected range of pressures and close a line when the line pressure falls outside the selected range. These systems also include safety-relief systems which are adapted to vent protected flow lines or pressure vessels when the pressure exceeds a certain maximum. Examples of safety-relief valves generally include a relief valve which includes a dome and a valve element. The valve element has an effective area that is smaller than the effective area of the dome. Both the dome and the valve element are exposed to in-service pressure, which maintains the relief valve in a close position. A controlled system is provided which is adapted to supply in-service pressure to the dome when the in-service pressure is less than the maximum. However, when in-surface pressure exceeds the maximum, the controlled system is adapted to block in-service pressure and bleed the dome thereby allowing the relief valve to open.

Pilot operated pressure relief valves for liquid or gas service are available in various sizes and pressure ranges from, for example, 30 to about 1500 pounds per square inch. These relief valves are designed for use in a variety of installations wherein there is a requirement to exhaust the over pressure volume or gas. These valves are employed by oil and gas producers, petrochemical and chemical plants, pipe line companies, oil refineries, transportation systems and the like.

The relief valve is closed when below its set point. The normally open pilot allows the system pressure to enter the piston housing cavity or dome of the relief valve on top of the free-floating piston. The top of the relief valve piston has a larger area than the valve seat where the piston seals. Equal pressure at both ends of the piston creates a differential downward force which holds the piston tightly closed on the valve seat.

In a typical pilot operated relief valve system, when the system pressure reaches the pilot set point, the pilot piston forces the pilot stem upward by compressing the pilot valve spring. This movement of the stem simultaneously blocks the system pressure passageway through the pilot and commences the bleeding of pressure from the relief valve piston housing cavity or dome. Decreasing pressure on top of the relief valve piston allows system pressure to move the piston off the valve seat, discharging the system overpressure.

One problem has been recurring on a regular basis in the operation of pilot operated relief valves. At installation, the relief valve may be at the open position and it is difficult to achieve the closed position. It may take application of pressure in the system to build pressure on the dome to close the valve. Many times the open valve outruns the input of pressure and remains open. In the past, the user has been forced to remove the control line to the dome and apply pressure with a gas source in order to move the valve to the closed position. Once the valve is moved to the closed position, the system can be pressurized and the valve works properly Such a difficulty in processed startup at installation presents a problem to the user. In addition to the initial installation startup difficulties, problems have been encountered with the relief valves in a similar vein because the valve will open and remain open upon rapid application of pressure on restart after a system shutdown where pressure was reduced to zero.

SUMMARY OF THE INVENTION

The solution for these problems is found in the addition of a dome pressure maintaining valve which is installed in the pilot operated relief valve circuit. The dome pressure maintaining valve traps pressure in the dome of the valve maintaining the valve closed even when inlet pressure drops to zero. The dome pressure maintaining valve does not have any effect on the normal operation of the relief valve and allows the dome pressure to drop to zero to fully open the relief valve during over pressure conditions. After testing the valve at assembly, pressure is trapped in the dome of the valve keeping the valve closed during shipping and installation. The installation and operation of the dome pressure maintaining valve does not effect operation, capacity or lift of the relief valve.

The dome pressure maintaining valve is installed up stream of the control inlet to the sensor. The valve in accordance with the invention may be built as a separate, in-line unit or may be incorporated in the pilot mounting block. The valve can be made with a fixed pressure setting or be made adjustable. The dome pressure maintaining valve according to the invention is comprised of a compact check valve and back flow relief valve, the two components being integrated into one piston.

DETAILED DESCRIPTION

Figure 1:
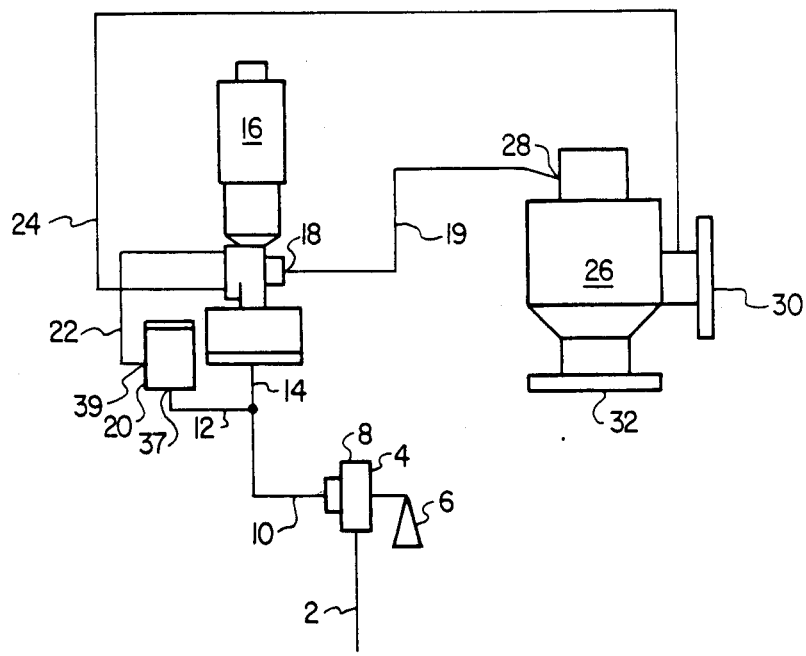
FIG. 1 is a schematic diagram of a pilot operated relief valve with a dome pressure maintaining valve installed within the circuit.

The dome pressure maintaining valve is designed for operation with a pilot operated pressure relief valve. The valve connects in the pressure line which supplies pressure to the dome of the valve at a point upstream of the relief valve pilot. The purpose of the valve is to retain pressure in the dome of the relief valve keeping the valve in the closed position except upon operation of the pilot.

Typically, the pressure in the dome of the relief valve is equal to the pressure at the inlet of the relief valve. The differential areas on the safety relief valve exposed to pressure create forces to keep the valve closed. In event of overpressure, the pilot will vent the pressure in the dome causing unequal pressures which will allow the relief valve to open. The dome pressure maintaining valve does not alter this normal operation. Typically, when pressure in the inlet of the relief valve drops to near zero, the dome pressure holding the valve closed also drops to near zero. At this time, the only force holding the valve closed is weight of the piston and in some instances, a very light spring. If pressure is suddenly applied to the inlet of the relief valve, the sudden upward force on the piston can lift the piston opening the valve before pressure can enter the dome through the pilot device. It can then become difficult to build enough pressure in the dome of the valve to reclose the safety valve, thus loss of product can occur during a startup or restart of a process. This situation can be prevented with the use of the dome pressure maintaining valve.

The dome pressure maintaining valve prevents the dome pressure from dropping below a preset value. Therefore, the dome pressure is retained even while the inlet pressure at the relief valve may drop to zero. When pressure is suddenly restored to the inlet of the valve, the retained pressure in the dome maintains the valve in the fully closed position preventing loss of product during restart of a process.

The dome pressure maintaining valve also contains an automatic relieving feature that will prevent excessive build up of pressure in the dome of the valve caused by thermal expansion or the like. Excess pressure will cause release of enough volume of fluid back into the inlet line to prevent further rise in pressure. No fluids are vented to atmosphere from the system. The pressure release setting may be either a fixed or an adjustable setting. Adjustment may be made by varying the spring force on top of the piston in the dome pressure maintaining valve.

The dome pressure maintaining valve has two ports to connect into the relief valve controls, the inlet port on the bottom and the outlet port on the side. On a preferred embodiment the valve is oriented with the cap upward as the operation of the poppet check valve depends upon gravity.

In the pilot operated pressure relief valve circuit which utilizes the dome pressure maintaining valve according to invention, a typical pilot would be a valve mechanism having a spool sealably slideable longitudinally within a bore in its body between alternate positions for contolling flow of a first fluid between lateral ports connecting with the bore. The spool is urged toward a first position by a force due to a spring arranged within a chamber at one end of the bore, and to a second position by a force due to the pressure of a second fluid acting across a piston reciprocable within a chamber at the other end of the bore. The spool will remain in the lower position as long as the pressure of the controlled fluid is below predetermined level. However, when the controlled fluid rises above the predetermined high level, the spool is lifted to its upper position so as to vent the control fluid from the relief valve. Such a pilot valve is described in U.S. Pat. No. 4,091,832 which is incorporated herein by reference.

When the pilot operated relief valve is closed i.e., the pressure acting upon the relief valve is below its set point, the normally open poppet means allows the system pressure to enter the piston housing cavity or dome of the relief valve on top of the free floating piston. The top of the relief valve piston has a larger area than the valve seat where the piston seals. Equal pressure at both ends of the piston creates a differential downward force which holds the piston tightly closed on the valve seat.

Under conditions wherein the relief valve is to open, such conditions existing when the system pressure reaches the pilot set point, the pilot piston forces the pilot spool upward by compressing the pilot valve spring. This movement of the spool simultaneously blocks the circuit pressure passageway through the pilot and commences the bleeding of pressure from the relief valve piston housing cavity or dome. Decreasing pressure on top of the relief valve piston allows the circuit pressure to move the piston off the valve seat discharging the system over pressure.

The schematic of FIG. 1 presents a sensing inlet 2 and an optional inservice test valve 4 which communicates inlet 2 with conduit 10 and when handle 6 is repositioned for testing, communicates test inlet 8 with outlet conduit 10 which communicates with inlet conduit 12 of the dome pressure maintaining valve 20. Inservice test valve outlet conduit 10 also communicates with inlet conduit 14 of pilot valve 16. Pilot valve 16 has an outlet 18 and an outlet conduit 19. The dome pressure maintaining valve 20 through outlet conduit 22 is in communication with pilot valve 16 and thus, in communication with relief valve 26. The pilot valve 16 is provided with an optional mode a pilot outlet exhaust conduit 24 which feeds to the relief valve outlet 30 thus, avoiding atmospheric exhausting. Relief valve 26 has an inlet 28 which supplies pressure to the dome above the piston in maintaining the valve in a closed normal operational mode. Upon overpressuring, the pilot activates withdraw of the relief dome pressure allowing the relief valve piston to open and provide pressure relief from the source through inlet 32 and expelling same through outlet 30.

The schematic of FIG. 1 presents the pilot operator relief valve 26 with a dome pressure maintaining valve 20 installed within the pressurized fluid flow circuit.

The circuit for maintaining dome fluid pressure in the pilot operated relief valve 26 is comprised of a fluid pressure, dome pressure maintaining valve 20 having an inlet port 37 for receiving pressurized fluid supply from a source requiring pressure relief maintenance and an outlet port 39 for expelling said pressurized fluid from the dome pressure maintaining valve 20. The dome pressure maintaining valve 20 being placed in the circuit between a sensor inlet and the pilot valve 16, the valve 20 capable of being adapted with fixed or adjustable pressure setting functionality. The dome pressure maintaining valve 20 outlet port 39 is in communication with the relief valve 26 through the pilot valve 16.

Figure 2:
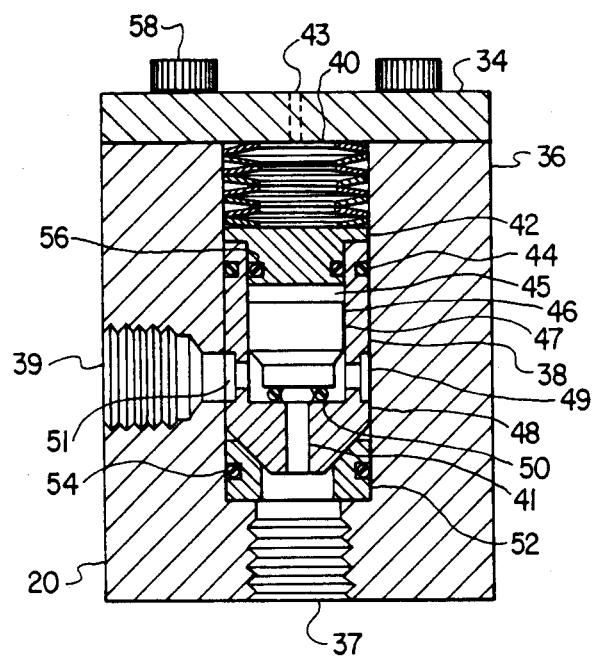
FIG. 2 presents a detailed sectional view of the dome pressure maintaining valve assembly of the present invention.

In FIG. 2, the dome pressure maintaining valve 20 functions through the poppet check valve 46 for equalizing inlet and outlet pressure, with the poppet check valve 46 providing inlet flow and check for reverse flow. The poppet check valve 46 and a piston valve 48 are integrated into one piston valve embodiment with the piston valve 48 providing outlet flow in a backflow relief mode thus, providing a fluid pressure maintenance valve having a pressure storage chamber 45 for providing and maintaining fluid pressure in the relief valve 26 dome without interfering with the normal operations of the pilot operated relief valve circuit and operation.

As pressure increases at the inlet port 37 of the dome pressure maintaining valve, fluid enters through a passage 41 in the piston 48, and lifts the poppet check valve 46 and flows under the o-ring 50, and out through the piston chamber side passages 49 and ring groove 51 to the outlet port 39. Once pressure is equalized and flow stops, the poppet check valve 46, will settle to allow contact between the o-ring 50 and the piston 48, preventing any back flow in to the inlet port 37. This operates as a standard check valve to allow flow in one direction, inlet to outlet, and restrict flow in the reverse direction.

Pressure in the outlet port 39 is contained in the body 36 and exposed to the o-ring seal 44 on the piston 48. Since only atmospheric pressure is exposed to the opposite side of the o-ring 44 through vent means 43 in cap 34, pressure from the outlet in port 39 creates an upward force on the piston 48. The same pressure is also exposed to the seat 52 and the seat o-ring 54, and to the contact surface between the piston 48 and the seat 52. This contact is on the inner edge of the seat 52. The pressure differential pressure, if any, between the outlet 39 and inlet 37 ports creates a downward force on the piston. The greater of the forces acting on the piston is in the upward direction. This difference in area, thus force is a result of pressurized fluid flow past the poppet check valve into piston chamber 45. When this force is greater than the compressed spring force exerted by spring means 40, the spring will compress allowing movement of the piston 48, away from seat 52, thus allowing reverse flow of fluid from the outlet and to the inlet port. The spring means 40 force is adjustable through adjustment means 59. This limits the pressure in the outlet port 39 to a predetermined amount when inlet pressure is below that predetermined pressure. When inlet pressure and outlet pressure are both above the predetermined level, the force on the piston seal area, o-ring 44, is sufficient to maintain the spring means 40 compressed against cap 34 which is held in place by mounting means 58. This compression is by plug 42 which is slidably and sealably mounted in piston chamber 45. Seal means 56 providing the seal between the piston chamber and plug 42. The force maintaining compression on the spring means 40 provides separation of the piston 48 and the seat 52 allowing a flow path between inlet and outlet ports.

The predetermined pressure level may be varied by changing the set spring force on spring means 40. A release mechanism may be added to remove spring preload force thus manual release of outlet pressure is easily accomplished by allowing it to flow back to the inlet port.

In the mechanical configuration shown in FIGS. 1 and 2, the poppet check valve 46 function is mechanically arranged inside the piston chamber 45. This could be located external to the piston without altering the function of the device. There may be many mechanical configuration that can accomplish the functions described above. This disclosure is of the functions provided and the valve and valve circuit shown, but are not limited to the exact configuration presented.

I claim:

1. A dome pressure maintaining valve comprising:

A body having an inlet port and outlet port in communication with a bore extending longitudinally therein, the body bore with a valve seat defined at a first end;

the inlet port in communication with the bore first end; the outlet port in communication with a mid-portion of the body bore;

a cap affixed to a second end of the body bore;

spring means defined at a second end portion of the body bore, the spring means in contact with the cap and a plug affixed to and sealing an open first end of a piston valve chamber;

the piston valve chamber extending longitudinally therein in axial alignment with the body bore and a poppet check valve movably mounted within the piston valve chamber;

the piston valve chamber in multiple port communication with the body bore through a second end portion of the piston chamber;

the poppet check valve and interior piston valve chamber wall defining a spacing therebetween;

a piston valve slidingly and sealingly mounted in the body bore, the piston valve having a piston element at a bottom portion which is engageable with the seat;

the piston valve piston element having passage defined therethrough; and the poppet check valve together with a seal element surrounding the piston element passage engageably sealing the piston element passage.

2. The dome pressure maintaining valve according to claim 1 wherein the poppet check valve is integrated into the piston valve chamber for inlet fluid flow and check for outlet fluid back flow.

3. The dome pressure maintaining valve according to claim 2 wherein the poppet check valve and piston valve are integrated in one piston valve embodiment with outlet back flow relief provided by the piston valve.

4. The dome pressure maintaining valve according to claim 3 wherein the spring means are adjustable to define different outlet flow pressure activating the piston valve as a back flow relief valve.

5. The dome pressure maintaining valve according to claim 1 wherein the cap fixed to the second end of the body bore is provided with a vent in communication with atmospheric pressure.

6. The dome pressure maintaining valve according to claim 1 wherein the piston passage is centered and axially aligned with the valve piston chamber and the body bore.

7. The dome pressure maintaining valve according to claim 1 wherein the body and body bore are mounted in a substantially vertical position, the poppet check valve forced to check position in the piston valve chamber through gravity.

8. A dome pressure maintaining valve according to claim 1 wherein the poppet check valve provides the check function through the operation of spring means.

9. The dome pressure maintaining valve according to claim 1 wherein the piston valve chamber communicates through mulitiple ports and a ring groove around the piston valve exterior wall with the body bore.

10. A dome pressure maintaining valve comprising:
   A body having an inlet port and outlet port in communication with a bore extending longitudinally therein, the body bore with a conical valve seat defined at a first end;
   the inlet port in communication with the bore first end; the outlet port in communication with a mid-portion of the body bore;
   a vented cap affixed to a second end of the body bore;
   spring means defined at a second end portion of the body bore, the spring means in contact with the cap and a plug affixed to and sealing an open first end of a piston valve chamber;
   the piston valve chamber extending longitudinally therein in axial alignment with the body bore and a poppet check valve movably mounted within the piston valve chamber;
   the piston valve chamber in multiple port communication with the body bore through a second end portion of the piston chamber and an exterior ring groove;
   the poppet check valve and interior piston valve chamber wall defining a spacing therebetween;
   a piston valve slidingly and sealingly mounted in the body bore, the piston valve having a conical piston element at a bottom portion which is engageable with the conical seat;
   the piston valve piston element having a passage defined therethrough in axial alignment with the piston valve chamber;
   the poppet check valve together with a seal element surrounding the piston element passage engageably sealing the piston element passage.

11. A system for maintaining dome fluid pressure in a pilot operated relief valve, comprising;
   a fluid pressure maintenance means having an inlet port for receiving pressurized fluid supply from a source requiring pressure relief maintenance and an outlet port for expelling said pressurized fluid from the fluid pressure maintenance means;
   the fluid pressure maintenance means being placed in a circuit between a sensor inlet and the pilot valve, the means capable of being adapted with fixed or adjustable pressure setting functionality;
   the fluid pressure maintenance means outlet port in communication with a dome of the relief valve through the pilot;
   the fluid pressure maintenance means functioning through a poppet check valve for equalizing inlet and outlet pressure, said poppet check valve providing inlet flow and check for reverse flow;
   the poppet check valve and a piston valve integrated into one piston valve embodiment with the piston valve providing outlet flow in a backflow relief mode; and
   the fluid pressure maintenance means having a pressure storage chamber for providing and maintaining fluid pressure in the relief valve dome.

12. The circuit for maintaining dome fluid pressure in a pilot operated relief valve according to claim 11 wherein if the inlet fluid pressure is greater than the outlet fluid pressure, fluid flow communication exists with a piston valve chamber through a passage from the inlet port through the piston thereby the poppet check valve is lifted, the inlet fluid communicates with the outlet through multiple ports in the piston valve chamber lower end portion and a piston exterior wall ring groove which is in alignment with said ports in communication with the outlet port.

13. The circuit for maintaining dome fluid pressure in a pilot operated relief valve according to claim 11 wherein the integrated poppet check valve and piston valve form one piston valve embodiment which provides outlet back flow relief when outlet fluid pressure is greater than inlet pressure, the outlet fluid pressure in communication with an upper end dome of the piston valve chamber defined by a plug which provides greater piston surface above the outlet port than below, a differential force provides an upward lift of the integrated piston valve; upon lift movement the piston valve, its seat and body bore define a passage communication of the outlet port with the inlet port.

14. The circuit for maintaining dome fluid pressure in a pilot operated relief valve according to claim 13 wherein the piston valve chamber retains pressure during outlet back relief action by the piston valve.

* * * * *